No. 838,135.  
PATENTED DEC. 11, 1906.  
J. H. NIVENS.  
CANOPY FOR SHELTERING HORSES FROM THE SUN'S HEAT  
AND FROM STORMS.  
APPLICATION FILED OCT. 30, 1905.
2 SHEETS—SHEET 1.
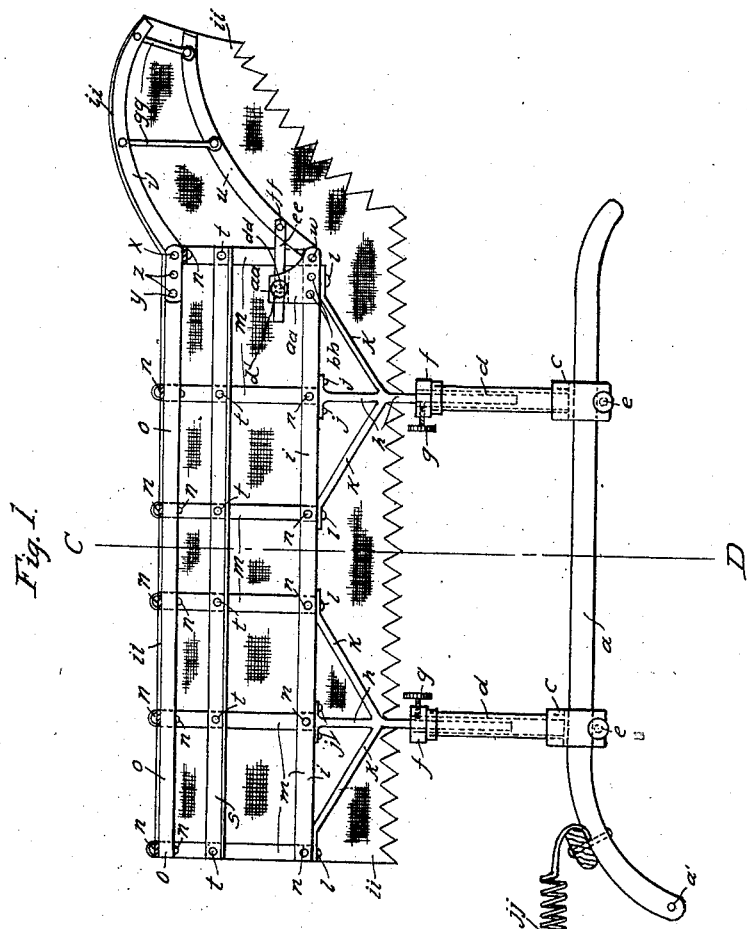
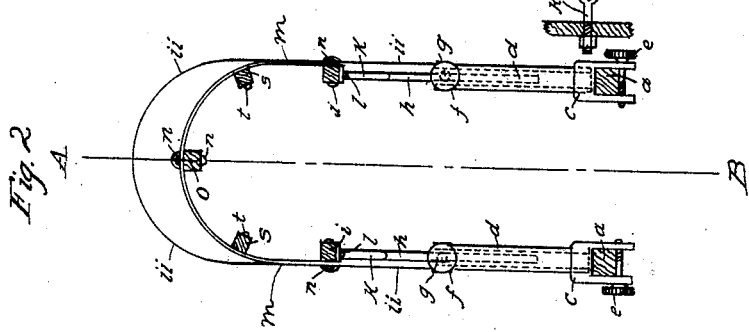
Witnesses  
Inventor  
James Harvey Nivens  
By John Day  
Attorney.

No. 838,135. PATENTED DEC. 11, 1906.
J. H. NIVENS.
CANOPY FOR SHELTERING HORSES FROM THE SUN'S HEAT
AND FROM STORMS.
APPLICATION FILED OCT. 30, 1905.
2 SHEETS—SHEET 2.
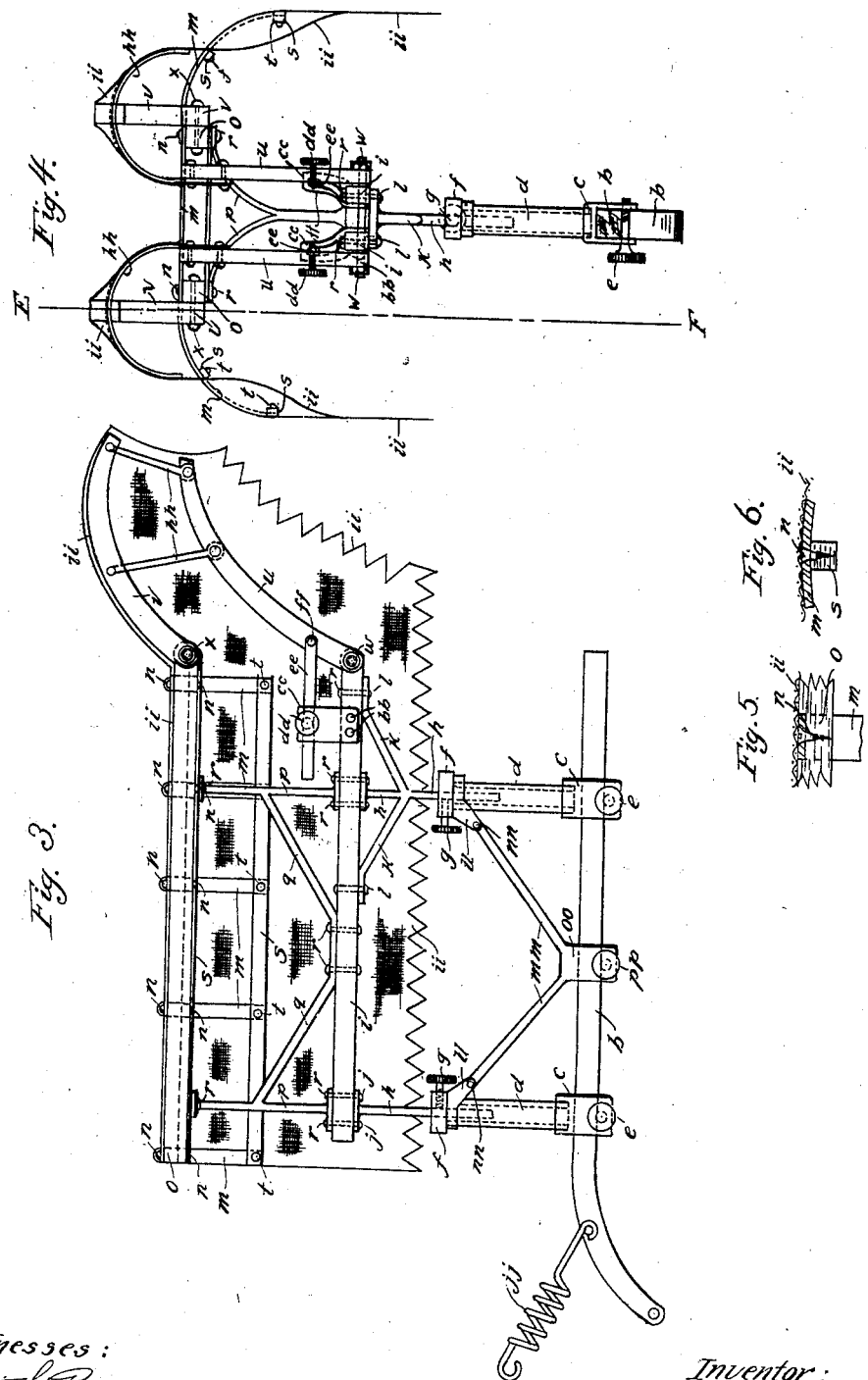

UNITED STATES PATENT OFFICE.

JAMES HARVEY NIVENS, OF NORWALK, CALIFORNIA.

CANOPY FOR SHELTERING HORSES FROM THE SUN'S HEAT AND FROM STORMS.

No. 838,135. Specification of Letters Patent. Patented Dec. 11, 1906.

Application filed October 30, 1905. Serial No. 285,223.

*To all whom it may concern:*

Be it known that I, JAMES HARVEY NIVENS, of the city of Norwalk, in the county of Los Angeles and State of California, have invented an Improved Canopy for Sheltering Horses from the Sun's Heat and from Storms, of which the following is a full, clear, and exact description or specification, reference being had to the annexed drawings and to the letters marked thereon.

This invention relates to certain new and useful improvements in the construction of canopies of the kind attached to or carried by the shafts and poles of road-vehicles, being carried by the shafts when used to shield a single horse from the sun's rays and from storms of rain, hail, sleet, snow, and wind and being carried by the pole of road-vehicles when applied for shielding a pair of horses harnessed abreast or in team.

My new or improved canopy is made with several of its parts adjustable, so as to be adapted to horses of different heights, and the canopy not only shelters the entire body of the horse, but has attached to it a second or similar adjustable canopy which shields the head of either a single horse or a pair of horses also.

Upon the annexed drawings, Figure 1 is an elevation, with the canopy shown in section, of my device as adapted for being attached to the shafts of a one-horse road-vehicle and taken upon the line A B, Fig. 2. Fig. 2 is a transverse section of the same through the body of the canopy—that is to say, taken on the line C D, Fig. 1. Fig. 3 is a view, partly in elevation and partly in longitudinal section, taken upon the line E F, Fig. 4, showing my new or improved canopy device as adapted for shielding a pair of horses harnessed abreast or in team. Fig. 4 is an end elevation looking toward that part of the canopies which are above the heads of a team of horses harnessed abreast and corresponding to Fig. 3. Fig. 5 is a longitudinal section of the upper part of one of the arched frames and one of the longitudinal frames of the canopy upon which the canopy cloth or other fabric is carried. Fig. 6 is a transverse section corresponding to Fig. 5.

With reference to Figs. 1 and 2, the shafts of the vehicle upon which the canopy for a single horse is carried are marked $a$. The rearward end of the shafts $a$ are curved, as shown at Fig. 1, for connection with the thill-coupling of the vehicle and through the hole $a'$, in which an ordinary thill-pin is passed in the usual manner. Upon each shaft $a$ the carriers $c\ c$ spanning each shaft $a$, are situated. Through the lower part of these carriers $c\ c$, fastening-screws $e\ e$ are passed, as shown at Figs. 1 and 2. The screws $e\ e$ are constructed with milled heads, as shown at Fig. 2, and the screwed ends thereof fastened into tapped holes in the inner part of the carriers $c\ c$, and below each shaft $a$, so that by tightening the screws $e\ e$ the carriers $c\ c$ are tightly secured to each shaft $a$. The carriers $c\ c$ support the vertical tubes $d\ d$, in the side of the upper end of each of which a milled set-screw $g$ passes through the thickened parts $f\ f$, constituting the upper ends of the tubes $d\ d$. The framing of the canopy, consisting of the parts hereinafter described, is carried upon the arms $k\ k$ and the intermediate upright members $j\ j$, projecting upward from vertical bars $h\ h$, which are held in the tubes $d\ d$ at any position of height required corresponding to the height of the horse drawing the vehicle by tightening the set-screws $g\ g$. Upon the upper part of the arms $k\ k$ and vertical member $j$ the horizontal bars $i\ i$ are carried and fastened by screws or bolts $l\ l\ l\ l$. To the bars $i\ i$ the curved members $m\ m$ are attached by screws or bolts $n\ n$, and to the sides and top of the curved members $m\ m$ other horizontal bars $s\ s$ and $o$ are similarly attached—that is to say, by bolts or screws $t\ t$ and $n\ n$, respectively.

The parts herein last described constitute the framing of that part of the canopy which is situated above the horse's body, and to the forward end of this portion of the framing there are attached the curved members $u$ and $v$, respectively, connected together by the movable links $g\ g$, as shown at Fig. 1. The inner end of the upper members $v$ of that part of the canopy which is situated above the horse's head are attached to the rear horizontal member, as by means of the pivot $x$, Fig. 1, and the two lower members of this part of the canopy are attached to the lower part of the canopy-framing there is attached by the pivot $f\ f$ the sliding bolt $e\ e$, which passes through a hole in each bracket $d\ d$, fastened to the outer end of each lower horizontal member $i\,i$ by the rivets or pins $b\,b$. A set-screw $d'$ is held in each bracket $d\,d$, which on being loosened enables the sliding bolt $e\,e$ to be moved horizontally in each bracket $d\,d$, accordingly as the forward members of the canopy-frame are moved upward and downward upon the pivots $w$ and $x$ for adjustment of this part of the canopy to the height of the horse's head, and by tightening the set-screw $d'$ this forward part of the canopy is held in the required position relatively with the height of the horse. The canopy-framing, which has now been described, is covered over with flexible cloth or other suitable covering $i\,i$, which is fastened to the canopy-framework by sewing, by tacks, or by any other suitable or convenient fastening.

In order that the weight of the canopy may not become an additional load to the horse drawing the vehicle, each shaft $a$ at its rear end is connected by a spring $j\,j$ to an eyebolt $k\,k$, fastened in the framework of the body of the vehicle. By adjusting the nut upon each eyebolt $k\,k$ the shafts $a\,a$ are held horizontally, or approximately so, so as to carry the canopy in the requisite position, while the springs $j\,j$ elastically support the weight of the canopy and allow of the shafts $a\,a$ having the ordinary ease of upward-and-downward movement upon the thill-pins $a'$, corresponding with the motion of the horse in traveling upon a roadway.

The device constituting the double canopy for a pair of horses harnessed abreast or in team, as shown at Figs. 3 and 4, is so closely analogous to that hereinbefore described with reference to Figs. 1 and 2 in respect of a single horse that a further description thereof is unnecessary, excepting to state that in place of the single canopy being carried by two sets of tubes $d\,d$, one set upon each shaft $a\,a$, the double canopy (shown at Figs. 3 and 4) is carried by a single set of tubes $d\,d$, supported upon the carrier $c\,c$, fastened by the pinching-screws $e\,e$ to the pole $b$ of a two-horse road-vehicle, and that the two canopies, one for each horse, respectively, are carried by the adjustable tubular supports $d\,d$ upon the pole $b$. The rods $h\,h$, by which the double canopy is carried in the tubes $d\,d$, are constructed at their outer ends with transverse projections for carrying two horizontal bars $i\,i$, as shown more especially at Fig. 4, and above the bars $i\,i$ there is carried the bifurcated frame $p\,p$, curving out on either side over the back of each horse, upon which there are again carried two horizontal bars $o\,o$, respectively, across which the transverse curved bars $m\,m$ are carried, which support the outer horizontal bars $s\,s$ of the canopy-framing.

The bars $s\,s$ are attached to the curved members $m\,m$ of the canopy-framing by bolts or screws $t\,t\,t\,t$, and that portion of the canopy-framing consisting of the upper member $v$ and the lower member $u$, together with the connecting-links $h\,h$, the pivots $w$ and $x$, the horizontal sliding bolt $e\,e$, the set-screws $d\,d$, and brackets $b\,b$, all correspond with the corresponding parts of the canopy for one horse, hereinbefore described with reference to Figs. 1 and 2, and which therefore need not be herein further described. The transverse curved members of the canopy-framing $m$ and the longitudinal members or bars $s$ thereof are fastened together by screws $n$, as more especially shown in the enlarged section, Figs. 5 and 6, and the entire canopy-framing is covered by cloth or other fabric or material $i\,i$, as hereinbefore described with reference to Figs. 1 and 2.

Having now described the nature of my said invention, I observe in conclusion that what I consider to be novel and original, and therefore claim as the invention to be secured to me by Letters Patent, is as follows:

1. The canopy-shield for one horse drawing a road-vehicle, consisting of the combination with the shafts of said vehicle of the adjustable carriers, the vertical tubes and set-screws upon the adjustable carriers, the vertical rods held in position in the vertical tubular carriers by the set-screws, the arms of the vertical rods, the horizontal bars attached to the arms of the vertical rods, the transverse curved members attached to and carried by the lower horizontal bars, the upper horizontal bars or members carried by the transverse curved members, the pivoted curved members forming the front end of the canopy-frame at the horse's head, the pivoted sliding bolt, set-screws and brackets for adjusting and holding the head portion of the canopy-framing and the covering of the canopy-frame, also the springs connecting the shafts with the framing of the body of the vehicle, all operating together in the manner and for the purposes substantially as hereinbefore described.

2. The canopy-shield for a pair of horses drawing a road-vehicle, consisting of the combination of the pole of the vehicle, the adjustable carriers attached to the pole, the tubes and set-screws forming the upper part of these adjustable carriers, the vertical rods and brackets operating adjustably in the tubular parts of these carriers, the horizontal members of the canopy-framing carried upon the brackets at the upper ends of the vertical adjustable rods, the bifurcated central members of the canopy-frame projecting above the horizontal members, the curved transverse members for carrying the upper and outer horizontal members of the canopy-frame, the pivoted curved members and links constituting that portion of the canopy-frame above the heads of the horses, and the means for adjusting the forward or head portion of the canopy-frame, the spring for connecting the pole of the vehicle to the framing of the vehicle thereby elastically suspending the pole, the cloth or equivalent covering of the canopy-frame, the whole constituting my new or improved canopy for two horses, all operating in the manner and for the purposes hereinbefore described.

JAMES HARVEY NIVENS.

Witnesses:
F. A. J. SHAFFER,
EARL TRUITT.